S. M. HOOVER.

Carriage-Spring.

No. 47,305.                                              Patented Apr. 18, 1865.

Witnesses:                                                Inventor:

UNITED STATES PATENT OFFICE.

SAMUEL M. HOOVER, OF CARLISLE, PENNSYLVANIA.

IMPROVED GUM-ELASTIC COUPLING-SPRING.

Specification forming part of Letters Patent No. 47,305, dated April 18, 1865.

*To all whom it may concern:*

Be it known that I, SAMUEL M. HOOVER, of Carlisle, in the county of Cumberland and State of Pennsylvania, have invented a new and useful Improvement on a Gum-Elastic Coupling-Spring; and I do hereby declare that the following is a full, clear, and exact description of the construction and operation of the same, reference being had to the annexed drawings, making a part of this specification.

Figure 1:
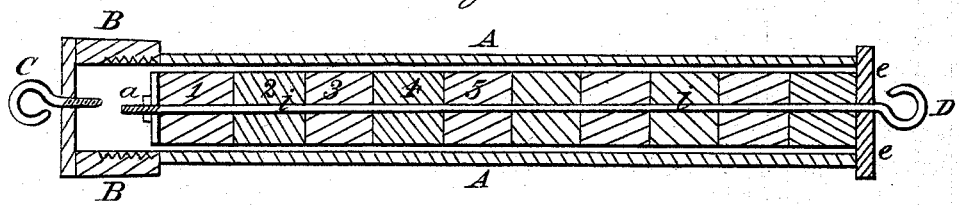
Figure 2:
Figure 3:
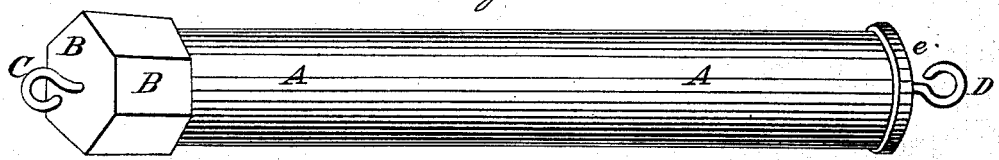

Figure 1 is a longitudinal section showing the different parts when put together. The numbers 1 2 3 4 5, &c., represent sections of the rubber spring. Fig. 2 exhibits a perspective view of said spring, and Fig. 3 a perspective view of the whole when finished for use.

I construct my spring by using vulcanized elastic rubber, inclosed in a metallic case, and divided in sections 1 2 3 4, &c., as shown in Fig. 1. The case is of a cylindric form, with a solid end, $e\,e$, pierced for the rod $i\,i$, which runs through the entire length of the rubber spring. The end $a$ of said rod is provided with a nut and washer, which rest on the rubber spring, as shown in the drawings. B B is a cap which screws slightly on that part of the metal case.

This spring I use for coupling railway-cars, connected to the hooks C and D, or is used for starting and drawing cars, especially along curves and sidelings, also for plowing and similar uses, to prevent sudden jerks and concussions when hitched to horses.

The working of the spring can readily be understood by reference to Fig 1.

A counter extension on C and D will act upon the washer at $a$, by means of the moving rod $i\,i$, and compress the different sections of the rubber in proportion to the amount of force exerted. Its unequal tension will produce the desired vibratory motion.

I am aware that vulcanized rubber has been used for springs, the various forms of which I do not claim, nor the manufacture or composition of the vulcanized rubber; but

What I claim, and desire to secured by Letters Patent, is—

The use of elastic-rubber inclosed in a metallic case, constructed and connected substantially as and for the purposes specified.

SAML. M. HOOVER.

Witnesses:
 HENRY HOSLER,
 JOHN IRVIN.